United States Patent [19]
Harrington

[11] Patent Number: 5,331,438
[45] Date of Patent: Jul. 19, 1994

[54] METHOD AND APPARATUS FOR IMPROVING FULL COLOR IMAGES USING PROCESS BLACK AND PRINTER BLACK

[75] Inventor: Steven J. Harrington, Holley, N.Y.

[73] Assignee: Xerox Corporation, Stamford, Conn.

[21] Appl. No.: 983,495

[22] Filed: Nov. 30, 1992

[51] Int. Cl.$^5$ .............................................. H04N 1/46
[52] U.S. Cl. .................................. 358/500; 358/516; 358/529; 358/534
[58] Field of Search ............... 358/500, 515, 516, 518, 358/520, 529, 530, 531, 532, 534, 296, 298; H04N 1/46

[56] References Cited

U.S. PATENT DOCUMENTS

| | | | |
|---|---|---|---|
| 4,275,413 | 6/1981 | Sakamoto et al. | 358/80 |
| 4,651,287 | 3/1987 | Tsao | 346/519 |
| 4,833,546 | 5/1989 | Numakura | 358/534 |
| 4,868,587 | 9/1989 | Loce et al. | 346/157 |
| 4,963,990 | 10/1990 | Henderson et al. | 358/458 |
| 5,008,742 | 4/1991 | Shigaki et al. | 358/529 |

FOREIGN PATENT DOCUMENTS 60-236579A 11/1985 Japan .................................. 358/529

*Primary Examiner*—Edward L. Coles, Sr.
*Assistant Examiner*—Jerome Grant, II
*Attorney, Agent, or Firm*—Oliff & Berridge

[57] ABSTRACT

A method for improving the quality of full-color images is disclosed. An original image is divided into a plurality of pixels. A neutral intensity value is determined for each pixel. A desired black-color intensity value is determined from the neutral intensity value. A printer-producible black value is determined from the desired value. The printer-producible black-color intensity value is used to rescale the original color intensity values of the pixels. The rescaled color intensity values are used to generate output color intensity values. The output image comprising the output color intensity values and the printer-producible black-color intensity value may then be converted to a continuously varying or halftone output image and output to an image output apparatus.

14 Claims, 4 Drawing Sheets

METHOD AND APPARATUS FOR IMPROVING FULL COLOR IMAGES USING PROCESS BLACK AND PRINTER BLACK

BACKGROUND OF THE INVENTION

1. Field of the Invention

The present invention relates to generating full color halftone images having smoothly varying grey-scale levels, and more particularly, to conditioning a generated image prior to a halftoning step, so that the halftoning step generates smoothly varying full color halftone images while avoiding the generation of visible halftone texture patterns and other printer-artifact patterns.

2. Description of the Related Art

Full-color electronic printers use a plurality of inks, such as cyan (C), magenta (M), and yellow (J) in three-color printers and C, M, J and black (K) in four-color printers. In such three- and four-color printers, different levels of color saturation for the three non-black colors (CMJ) are generated by using a halftoning process. In addition, the full spectrum of colors is generated by selectively overlapping each of the different separation colors. In a three-color electronic printer, black is generated by overlapping all three of the separation colors, while in a four-color printer, black can be either generated by combining the three separation colors (process black) or by using the black ink (printer black).

In halftoned image generation, the individual pixels, which comprise the image plane upon which the original image is mapped, are grouped into small or unit cells. A halftone screen is applied to the unit cells of the original image to generate a halftone image suitable for printing on an image reproduction apparatus. For example, U.S. Pat. No. 4,868,587 to Loce et al., assigned to the same assignee as the present invention and incorporated herein by reference, discloses a cell size of 18 pixels. A unit cell of 18 pixels can produce up to 19 different grey-scale levels for each color, from pure white (blank) to fully saturated (all pixels colored). The 18 pixels of a unit cell can be arranged in any shape desired, although it is generally desirable to minimize the radius of a circle which would completely enclose the cell. It is also necessary for the shape to be spaced-filling (i.e., no pixels of the image plane appear between a two adjacent unit cells). An example of such a unit cell is shown in FIG. 1.

However, because only 19 grey-scale levels are obtainable with an 18 pixel unit cell, the discrete shifts between the adjacent grey-scale levels are noticeable to the human eye, as shown in FIG. 2A. The problem of abrupt density shifts can be reduce by employing a larger halftone cell with more grey-scale level. However, this has the undesirable effect of making the halftone pattern more visible. Currently, it has been proposed to also reduce the halftone cell visibility by grouping a plurality of the unit cells into a large halftone cell. Commonly, four such unit cells are grouped into the large halftone cell, which is commonly called a "quad dot". In operation, the halftone screen is dispersed over the four unit cells of the quad dot, such that one pixel of each of the four unit cells of a quad dot is filled in before a second one of any of the unit cells of the quad dot are filled in. In this matter, the 19 levels of a single unit cell can be spread out and duplicated over 4 times the area, generating 76 (4×19) different grey-scale levels. Accordingly, as shown in FIG. 2B, the difference between any two adjacent grey-scale levels is indistinguishable to the human eye and the degree of saturation or the density of the image can vary continuously.

However, as is noticeable in FIG. 2B, a quad dot halftone scheme generates vertical lines in approximately one half of the grey-scale levels. These vertical lines are caused by the filled-in pixels within a quad dot aligning, and the aligned pixels within each quad dot aligning with the aligned pixels of its vertically adjacent neighbors. Therefore, while the problem of abrupt density shifts between grey-scale levels when using unit halftone cells is reduced, there is still a problem of artifact patterning or a "visible texture" generated in the image when using a quad dot halftone cell.

SUMMARY OF THE INVENTION

Accordingly, it is an object of the present invention to provide an undercolor removal and halftoning method which avoids both abrupt density shifts and textures.

It is another object of the present invention to provide a method for converting three-color full color images to four-color full color images.

It is a further object of the present invention to provide a method for changing the under-color removal/grey component replacement ratio in a full-color image output apparatus without requiring recalibration of the image output apparatus.

To achieve the foregoing and other objects and to overcome the shortcomings discussed above, a method for generating a full color halftone image from a continuously varying original image is provided which generates a smoothly varying, texture-free halftone image. The original image is defined as an array of pixels, each pixel having a desired color value. The color value for each pixel is factored into chromatic components comprising a combination of the three subtractive primary colors cyan, magenta and yellow, and a neutral or gray component which can be produced either by black ink or balanced amounts of the cyan, magenta and yellow inks, or by some combination of the two methods. The desired black-ink (printer black) contribution to the neutral component of each pixel color is determined based on the particular image output apparatus to be employed in outputting the image. The value of the colors to be produced by the C, M and J inks are then determined such that when printed in combination with the producible level of printer black, the desired color is achieved. In this way the three-color (process black) is used to compensate for discrepancies between the level of black producible by printer when using the black ink and the total amount required for the color. This permits the use of a small halftone cell size for the black ink, which diminishes the visible texture patterns at the cost of fewer producible black levels, while simultaneously allowing for the three chromatic components of the halftone image to be generated from the original image, which provides for a continuously varying halftone image.

Accordingly, as shown in FIG. 3, a smoothly varying halftone image can be produced without any visible textures or printing-artifact patterns. Likewise, using the same system, the black generated by overlapping all three colors in a three-color full color image can be replaced with an independent black color separation layer, allowing for the use of black ink in a four-color image output apparatus. Finally, since the scheme determines the color which should be produced by the colored (C, M, J) inks, such that when combined with the black ink the desired color is achieved, and since this is done for whatever portion of the neutral component is selected for production by the black ink, the proportions of the neutral component going into printer black and process black can be altered without having to recalibrate the image exposure apparatus. The calibration of the image exposure apparatus must determine only how much of each of the C, M, and J inks are needed to produce a given color. The method of the present invention alters the "given" color in order to compensate for the use of some black ink, rather than requiring a full recalibration of the image reproduction apparatus to generate colors produced by four inks.

BRIEF DESCRIPTION OF THE DRAWINGS

The invention will be described in detail with reference to the following drawings, in which like reference numerals refer to like elements, and wherein.

DETAILED DESCRIPTION OF THE PREFERRED EMBODIMENTS

Figure 1:
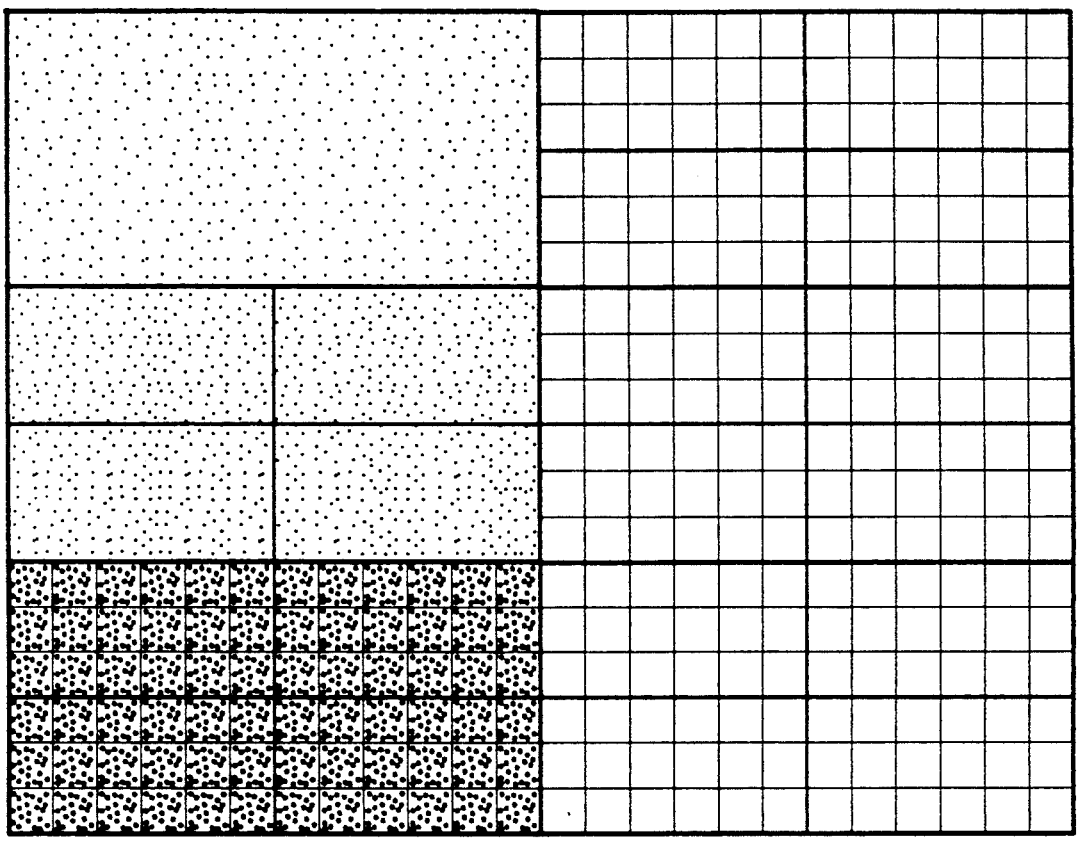
FIG. 1 illustrates one type of 18-pixel, space filling unit cell and large halftone cell.
Figure 2A:
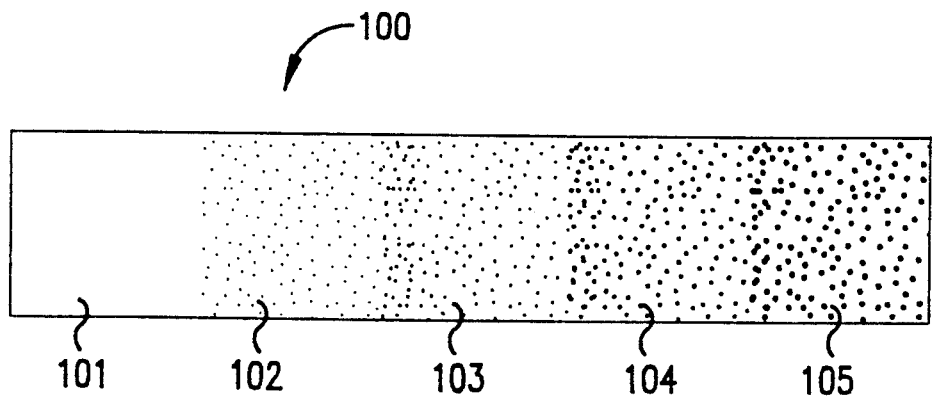
FIG. 2A shows a black and white representation of a full color halftone image employing only an 18-pixel unit cell.

Referring now to the drawings, in particularly to FIG. 2A, an exemplary halftone image 100 is shown. The halftone image is a black and white reproduction of a full color image and is generated from an original, continuously varying full color image. The abrupt shifts in density between portions 101 and 102, 102 and 103, 103 and 104 of image 100 can be readily seen in FIG. 2A.

The original, continuously varying full color image comprises a plurality of pixels. The original full color image will have been generated using an image generator such as a scanner, computer or the like, its colors being defined in additive color space. Accordingly, for each pixel z of the full original image, the color value of that pixel may be represented as a red (R) color component value, a blue (B) color component value and a green (G) color component value.

The first step in the color conversion process of the present invention is to determine, for each pixel z of the original image, the desired amount of printer black to use in producing the color value for that pixel. This is called gray component replacement. This may be provided by the image generator, although typically it is not. The precise method for determining this amount of black ink depends upon the format of the color specification provided by the image generator as well as the particular scheme chosen for the gray component replacement.

In a first preferred embodiment of the present invention, this is done by first determining for each pixel z the neutral component $V_n$ of the color of the pixel, then selecting some portion of the neutral component $V_n(z)$ as a printer black component $V_p(z)$. If, for example, the additive primaries red, green and blue (R, G and B) are used to specify the color, having color component values $V_r(z)$, $V_g(z)$, $V_b(z)$, respectively for each pixel z, the neutral component $V_n(z)$ is determined as $$V_n(z) = 1 - \max(V_r(z), V_g(z), V_b(z)) \quad (1)$$

where the max function returns the maximum value of the three color component values $V_r$, $V_g$ and $V_b$. More complex formula than the simple maximum function can be used.

From the neutral component $V_n(z)$, a portion $V_k(z)$ to be produced by the printer black can be selected as a desired undercolor removal fraction, by $$V_k(z) = A(V_n(z)) \quad (2)$$

where A is an arbitrary function. The function A may be a simple scaling function, as in $$V_k(z) = a\, V_n(z) \quad (2A)$$

but often a more complex function is used, such as $$V_k(z) = V_n(z)^2 \quad (2B)$$

An arbitrarily complex function can be implemented by a simple look-up table $$V_k(z) = \text{Table 1}[V_n(z)] \quad (2C)$$

where Table 1 is an arbitrary table.

Figure 2B:
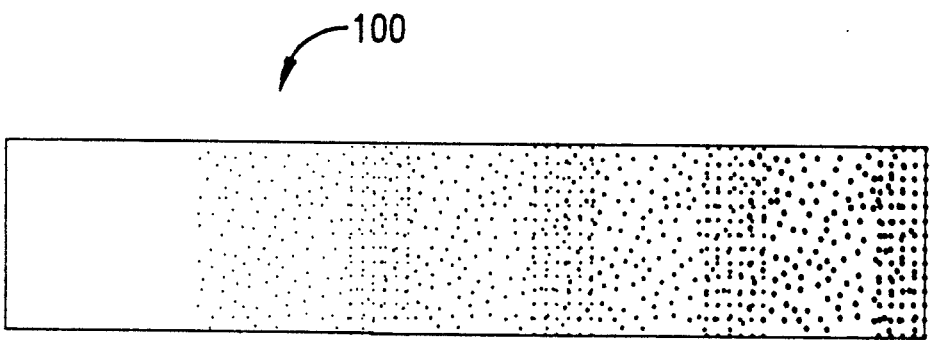
FIG. 2B shows a black and white representation of a full-color halftone image employing a quad scheme with an 18-pixel unit cell.
Figure 3:
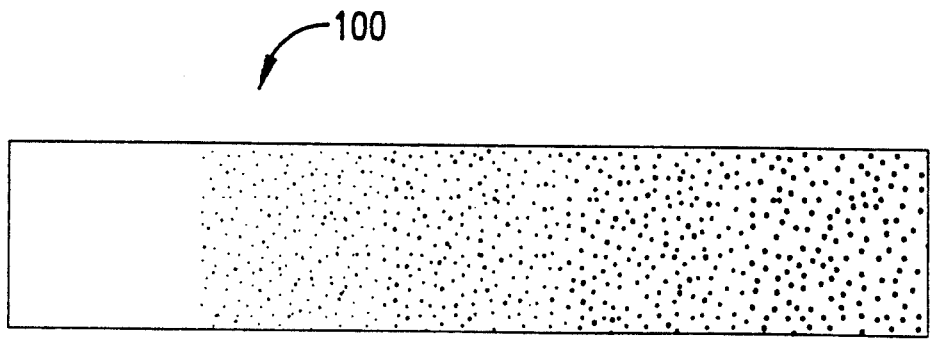
FIG. 3 shows a black and white representation of a full color halftone image generated using the present invention.

The second step in the first preferred embodiment of conversion process determines the actual amount of printer black $V_p(z)$ to be used in producing the color of each pixel z. The first step determined a desired level of black ink. However many printing devices are unable to produce arbitrary levels of printer black. Often a digital halftone is used which restricts the producible black level to a fixed set of gray levels. This set of producible black levels depends upon the definition of the halftone screen cell. A larger cell size can produce more black levels, but at the same time has the undesirable effect of producing a more visible halftone structure, as shown in FIG. 2B. A smaller cell size gives a less visible halftone, but also fewer possible gray levels, as shown in FIG. 2A. The second step in the conversion process is to replace, for each pixel z, the desired level of printer black $V_k(z)$ with a black level $V_p(z)$ that can actually be produced.

Because most image output apparatus produce quantitized rather than continuously varying color intensities, a desired scaled neutral component $V_k(z)$ may lie between two quantized intensity levels $V_x$ and $V_{x+1}$. Accordingly, the desired scaled neutral intensity component $V_k(z)$ is divided into two parts, one part being a directly printer-producible black-color intensity component $V_p(z)$ equal to one of the quantized intensity levels $V_x$ of the image output apparatus. The other portion, the process black portion $V_q(z)$ is the difference between the printer producible black-color intensity component level $V_p(z)$ and the scaled neutral intensity component $V_k(z)$, along with the difference between the desired printer black $V_k(z)$ and the neutral component of the color $V_n(z)$. This process black portion $V_q(z)$ is generated by combining all three of the subtractive colors, C, M and J.

The process of mapping from the desired black amount $V_k(z)$ to the producible amount $V_p(z)$ can be carried out by a table look up $$V_p(z) = \text{Table2}[V_k(z)] \quad (3)$$

where Table 2 is a printer-dependent table that gives producible amounts of printer black to use for each possible desired amount of printer black.

The third step in the first preferred embodiment of the conversion process is to adjust the original color specification to compensate for the black ink being printed. This adjustment depends upon how the colors are specified and how the image output apparatus produces them. However, in the first preferred embodiment, the colors of each pixel z are specified in an additive color space, by red, green and blue color components, and the placement of the black ink by the image output apparatus is effectively uncorrelated with the placement of the cyan, magenta and yellow inks, by rotating the halftone screen for each different ink. In this case the black ink can be modeled as a gray filter through which the other colors are observed. To achieve the desired color for each pixel the color specification must be boosted to compensate for the light which is lost due to this gray filter. Using a simple statistical model of the behavior of the black ink, the adjusted colors for each pixel z would be given by $$V_r'(z) = V_r(z)/(1 - V_p(z))$$
$$V_g'(z) = V_g(z)/(1 - V_p(z))$$
$$V_b'(z) = V_b(z)/(1 - V_p(z)) \quad (4)$$

More complex models are possible and a more general form for the adjustment would be $$V_i'(z) = F_i(V_i(z), V_p(z)) \quad (4A)$$

where i is the color component (e.g. r, g, or b) and $F_i$ is some arbitrary function for the component i of the initial color specification and the amount of printer black. Complicated functions can be implemented by means of a table look-up (possibly augmented by interpolation).

The fourth step in the first preferred embodiment of the conversion process is the determination of the cyan, magenta and yellow ink amounts necessary to form the adjusted color specification for each pixel z. This color correction problem has been considered by others and can be carried out by well known means such as the look-up table and interpolation methods taught by Sakamoto et al. (U.S. Pat. No. 4,275,413).

Note, however, that the fourth step is now independent of the amount of printer black used and the methods used to determine it. The tables needed for this stage can be built upon the three color printer calibrations (C', M', and J') for the particular image output apparatus to be used without consideration of the printer black values $V_p(z)$. The grey-component replacement scheme can be changed (e.g. by changing the function A) without having to change the tables used in the fourth step and without having to recalibrate the printer.

The replacement, for each pixel (z), of the desired amount of printer black $V_k(z)$ by the amount of printer producible black $V_p(z)$ assures that to the extent possible the process black formed by the combination of the cyan, magenta and yellow inks will compensate for any color errors occurring due to the quantization of the printer black $V_p(z)$ to one of printer producible black levels $V_x$. Accordingly, use of the method of the present invention will produce a halftone image having smoothly varying grey-scale levels.

Because of the high contrast of the black ink, its halftone textures tend to be more visible than those of the other colors. Therefore, a smaller halftone cell size for the black ink should be used. While this will make the black halftone texture smaller and less visible, it will also result in fewer gray levels. This would be a problem except that the present invention explicitly determines the difference for each pixel z between the desired neutral component $V_n(z)$ and the printer producible black level $V_p(z)$ and uses three-color process black $V_q(z)$ to compensate. thus, a coarser black screen can be used without the false contouring that arises from too few gray levels.

Figure 4:
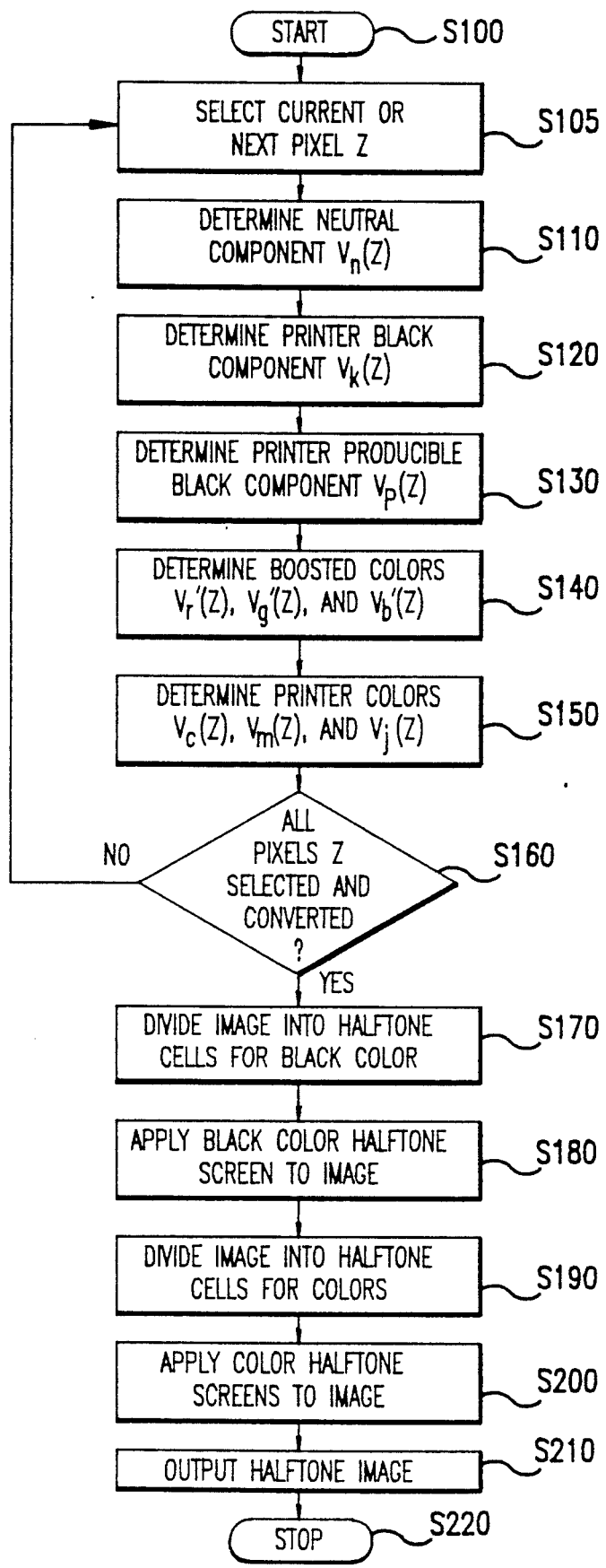
FIG. 4 shows a flow chart illustrating the method of the present invention.

Accordingly, in a first preferred embodiment of the present invention as shown in FIG. 4, starting from step S100, in step S105 a current pixel is selected and, in step S110 the neutral component $V_n(z)$ is determined, on a pixel-by-pixel basis, for each pixel z of the image, from the color component component values $V_r(z)$, $V_g(z)$ and $V_b(z)$ of pixel z.

In step S120, the printer black portion $V_k(z)$ of the neutral component $V_n(z)$ is determined, and in step S130, the closest printer-producible printer black portion $V_p(z)$, is determined.

Next, in step S140, the boosted color components $V_r'(z)$; $V_g'(z)$ and $V_b'(z)$ for each of the color components $V_r(z)$, $V_g(z)$ and $V_b(z)$ of pixel z are determined. Then, in step S150, the printer color component values $V_c(z)$, $V_m(z)$ and $V_f(z)$ of pixel z are determined from the boosted color components $V_r'(z)$, $V_g'(z)$ and $V_b'(z)$. Next, in step 160 a determination is made as to whether all of the pixels z of the image have been processed. If not, flow jumps to step S105, which selects the next pixel z. If so, flow continues to step S170.

In steps S170–S200, a halftone screen for the black and each of the three color components is applied to each color component layer of the original image to generate the output, halftone image. First, in step S170, the original image is divided into a plurality of small unit cells, and in step S180 the printer black halftone screen is applied to the black color component $V_p$ of the pixels of the original image. Then, in step S190, the original image is divided into a plurality of halftone cells for each of the three color components. The halftone cells for the three color separations may be larger than those for the black separation, and a quad dot cell (or the like) may be used. In step S200 the halftone screens for the three color components C, M and J are applied to the corresponding color component values $V_c(z)$, $V_m(z)$ and $V_f(z)$ of each pixel z of the original image. Finally, in step S210, the halftone image is output from the controller to the image output apparatus.

Figure 5:
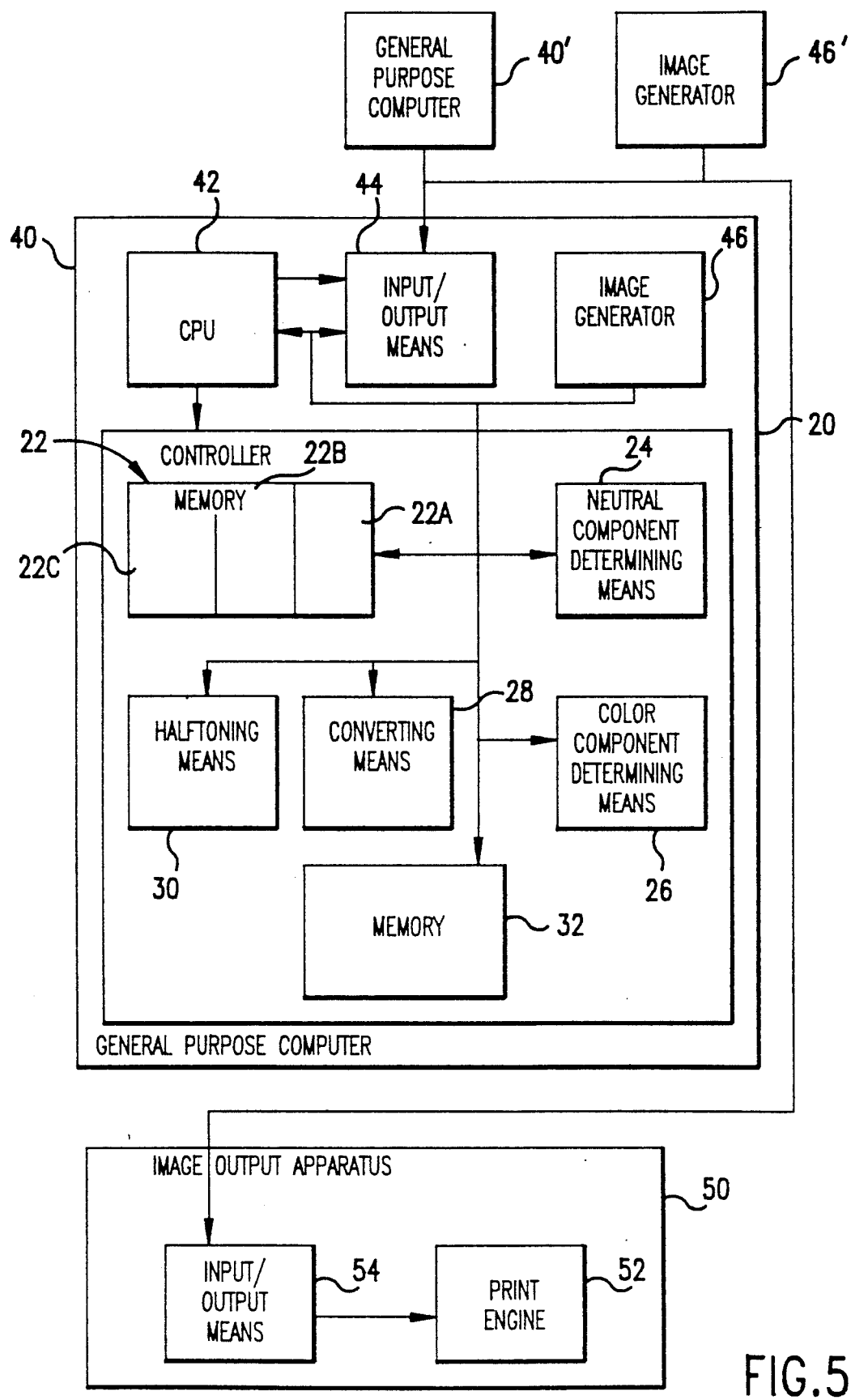
FIG. 5 is a block diagram showing an apparatus for practicing the present invention.

As shown in FIG. 5, the controller 20 can be located either in the output apparatus 50 or a general purpose computer 40. The output apparatus 50 comprises a print engine 52 and an input/output means 54. Likewise, the general purpose computer comprises a CPU 42 and an output/output means 44. Preferably, the controller 20 is located in the image output apparatus, so that the controller 20 can be turned to the operating capabilities of the print engine 52. Alternately, the controller can be incorporated into the general purpose computer 40, so that a single controller 20 can be used to output the converted image to a plurality of image output apparatus 50, each apparatus 50 having different capabilities.

In operation, an original image to be converted is generated by an image generator 46. The image generator 46 can be incorporated into either the image output apparatus 50, the general purpose computer 40 or some third device 46' which is networked to the general purpose computer 40 or the image output apparatus 50. For example, the image generator can comprise a full-color scanner. The scanner can be a stand-alone unit connected to the general purpose computer 40, or can be incorporated into the image output apparatus 50. Alternately, the original image can be generated by another general purpose computer 40' or the like and transmitted to the general purpose computer 40 or the image output apparatus 50.

In operation, the original, continuously-varying full-color image comprising a plurality of differably colored pixels is generated by the image generator and transmitted to the controller 20, where it is stored in a first portion 22A of a memory 22.

The original image is then output, on a pixel-by-pixel basis, from the memory 22 to a neutral component determining means 24, which determines the neutral black, printer black and process black components $V_n(z)$, $V_k(z)$ and $V_p(z)$ for each current pixel z. The black color component $V_p(z)$ for each pixel z are then output by the neutral component determining means 24 to a second portion 22B of the memory 22, and to a color component determining means 26. The color component determining means also inputs the color components $V_r(z)$, $V_g(z)$ and $V_b(z)$ for the current pixel z from the first portion 22A of memory 22, and determines the boosted color components $V_r'(z)$, $V_g'(z)$ and $V_b'(z)$. These boosted color components are then output to a converting means 28. The converting means 28 then outputs the $V_c(z)$, $V_m(z)$ and $V_j(z)$ color components for the current pixel z to the second portion 22B of the memory 22, where they are stored. This process is repeated for each pixel z of the original image.

Once all the pixels of the original image have been analyzed and converted, the entire converted image stored in portion 22B of memory 22 is output to a halftoning means 30, which divides the converted image into small and large cells, and applies the black, cyan, magenta and yellow halftone screens to the converted image to generate the halftone image. The halftone image is then either stored in the memory 22, in either the second portion 22B or a third portion 22C, or output to be transmitted to the print engine 52 or stored in some further memory means 32.

Alternatively, it is to be understood that the neutral component and color component determining means 24 and 26 and the converting means 28 can be further divided into individual means for determining the $V_n$, $V_k$ and $V_p$ components and the three boosted color values $V_r'$, $V_g'$ and $V_b'$, and the $V_c$, $V_m$ and $V_j$ color values, or grouped into any combination thereof.

In the embodiment shown in FIG. 5, the controller 20 is part of a general purpose computer 40. The general purpose computer 40 causes the input/output means 44 to output the converted image to the input/output means 54 of the image output apparatus 50, which transfers the converted image to the print engine 52. The print engine 52 then outputs the converted image as a full color, 4-color image onto an image receiving sheet.

It should be understood that the method of the present invention can also be used to improve any type of output image, whether the output image is a continuously varying image or a halftone image, and may be used to improve halftone images on a unit-halftone cell basis or the like as well as a pixel-by-pixel basis, when using an image reproducing apparatus which can vary the color saturation continuously on a pixel-by-pixel basis.

Although the invention has been described with reference to a specific preferred embodiment, it is not intended to be limited thereto, rather those skilled in the art will recognize that variations and modifications may be made therein which are within the spirit of the present invention and within the scope of the following claim.

What is claimed is:

1. A method for improving color output images printed on a selected printer, comprising:
   (1) inputting an original full color image comprising original color components, the image comprising a plurality of pixels, each pixel having original color component values;
   (2) selecting one of the plurality of pixels;
   (3) determining original color component values for the original color components of the selected pixel;
   (4) determining a neutral component value of the selected pixel;
   (5) determining a printer producible black component value of the neutral value component producible by the selected printer;
   (6) determining boosted original color component values based on the printer producible black component value;
   (7) determining non-black output color component values based on the boosted non-black original color component values of the selected pixel;
   (8) repeating steps 2–7 for remaining ones of the plurality of pixels to create a converted image; and
   (9) outputting the converted image.

2. The method of claim 1 where the output step comprises generating a halftone output image.

3. The method of claim 1 where the original color components are red, green and blue.

4. The method of claim 3 where a largest of the original red, green or blue components is determined for each pixel, and the neutral intensity value is determined based on the determined largest original color value.

5. The method of claim 1 where the printer producible black component value determining step comprises the steps of:
   determining a desired printer black component value; and
   determining a closest producible printer black component no greater than the desired printer black component value.

6. A method for converting a 3-color output-color input image to a 4-color output image comprising:
   (1) inputting the 3-color output-color image, the output color image comprising a plurality of pixels, each pixel having a first output color component, a second output color component and a third output color component;
   (2) converting the output-color image to an original color image;
   (3) selecting one of the pixels;
   (4) determining first, second and third original color values of the selected pixel for first, second and third original color components;

(5) determining a neutral intensity value based on the determined original color values;

(6) determining an output black-color intensity value component of the determined neutral color intensity value, wherein the output black color intensity value component comprises a printer-black color component and a process-black color component, the printer-black color component value determined based on printer-producible black component values;

(7) determining first, second and third output color intensity values for the selected pixel based on the determined original color values and the determined output black color intensity value;

(8) converting the selected pixel having the first, second and third input color components to a selected output pixel having the first, second and third output-color components;

(9) combining the first, second and third output color components with the determined output black color value to form a 4-color output image pixel;

(10) repeating steps 3-9 for each remaining original pixel, thereby creating a 4-color output image; and

(11) outputting the 4 -color image.

7. The method of claim 6, wherein the step of determining first, second and third output color values comprises the step of boosting the first, second and third output color values based on the printer-black color component value.

8. An apparatus for converting a 3 color original image to a 4 color output image, comprising:

a first memory for storing at least one pixel of the 3 color original image, the image comprising a plurality of pixels and having 3 color components, each pixel having a first original color component value, a second original value and a third original color component value;

a neutral component determining means for determining at least one of a neutral component value, a black component value and a printer-producible black component value for each of the plurality of pixels;

a boosted color component determining means for determining a boosted first original color component value, a boosted second original color component value and a boosted third original color component value for each of the plurality of pixels;

an output color component determining means for determining a first output color component value, a second output color component value and a third output color component for each of the plurality of pixels; and a second memory for storing for at least one pixel at least the printer-producible black component value and the first, second and third output color component values of each of the plurality of pixels.

9. The apparatus of claim 8, further comprising:

an output means for outputting at least the printer-producible black component value and the first, second and third output color component values of each of the plurality of pixels to one of a printer, a third memory and a general purpose computer.

10. The apparatus of claim 8, wherein the original image is input to the first memory from one of at least a scanner and a general purpose computer.

11. The apparatus of claim 8, wherein the first memory and the second memory are portions of a single memory.

12. The apparatus of claim 8, wherein the neutral component determining means comprises at least one of a neutral component value determining means for determining the neutral component value, a black component value determining means for determining the black component value and a printer producible black component value determining the printer producible black component value.

13. A method for improving color output images, comprising:

(1) inputting an original full color image comprising original color components, the image comprising a plurality of pixels, each pixel having original color component values;

(2) selecting one of the plurality of pixels;

(3) determining original color component values for the original color components of the selected pixel;

(4) determining a neutral component value of the selected pixel;

(5) determining a printer black component value of the neutral value component;

(6) determining boosted original color component values by scaling the original color component values by a function of the printer black component value;

(7) generating a converted pixel comprising non-black output color components based on the boosted non-black original color component values of the selected pixel;

(8) repeating steps 2-7 for remaining ones of the plurality of pixels to create a converted image; and (9) outputting the converted image.

14. A method for improving color output images, comprising:

(1) inputting an original full color image comprising original color components, the image comprising a plurality of pixels, each pixel having original color component values;

(2) selecting one of the plurality of pixels;

(3) determining original color component values for the original color components of the selected pixel;

(4) determining a largest one of the original color component values for each pixel;

(5) determining a neutral component value of the selected pixel based on the determined largest original color component value;

(6) determining a printer black component value of the neutral value component;

(7) determining boosted original color component values based on the printer black component value;

(8) generating a converted pixel comprising non-black output color components based on the boosted non-black original color component values of the selected pixel;

(9) repeating steps 2-8 for remaining ones of the plurality of pixels to create a converted image; and

(10) outputting the converted image.

* * * * *